No. 842,754. PATENTED JAN. 29, 1907.
F. A. BIERIE.
TRUCK FOR CONVEYING MERCHANDISE.
APPLICATION FILED MAR. 17, 1905.
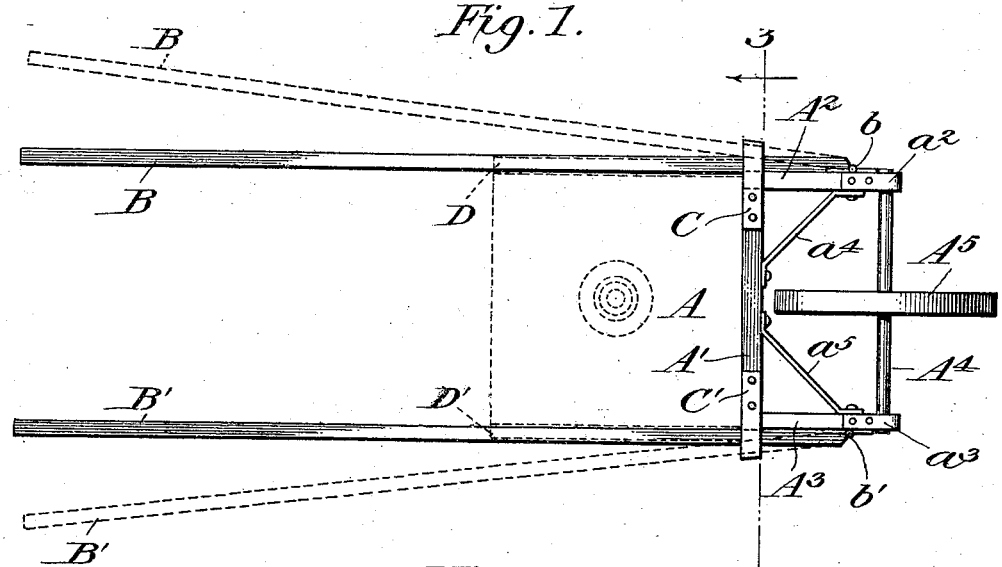
Fig. 1.
Fig. 3.
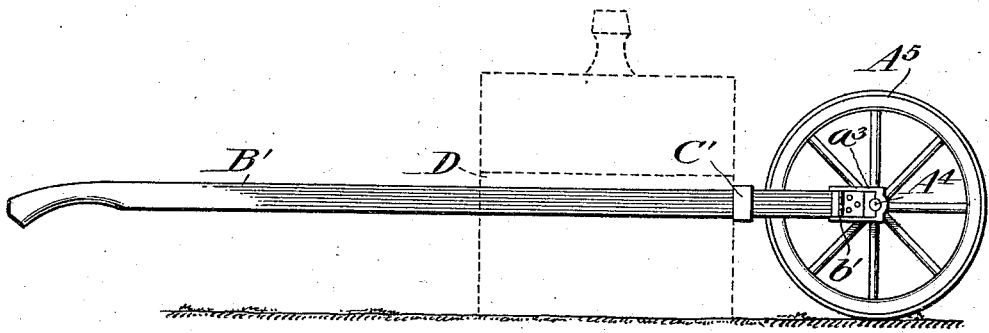
Fig. 2.
Witnesses:
Walter J. Raymond
Robert J. Arundel
Inventor,
Frederick A. Bierie
By his attorney
Walter W. Calmore

UNITED STATES PATENT OFFICE.

FREDERICK A. BIERIE, OF PHILADELPHIA, PENNSYLVANIA.

TRUCK FOR CONVEYING MERCHANDISE.

No. 842,754.     Specification of Letters Patent.     Patented Jan. 29, 1907.

Application filed March 17, 1905. Serial No. 250,576.

*To all whom it may concern:*

Be it known that I, FREDERICK A. BIERIE, a citizen of the United States, residing at Philadelphia, in the county of Philadelphia and State of Pennsylvania, have invented certain new and useful Improvements in Trucks for Conveying Merchandise, of which the following is a specification.

My invention relates to new and useful improvements in trucks for conveying merchandise from one place to another, but more particularly for the purpose of handling boxes containing carboys of acid and like fluids.

My invention will be more fully understood by reference to the accompanying drawings, in which—

Figure 1 illustrates a plan view of my device, the dotted lines therein indicating the manner in which the arms are extended in grasping the box containing the carboy. Fig. 2 represents a side elevation of the same with the box containing the carboy shown in dotted lines, and Fig. 3 shows a cross-section on the line 3 3 of Fig. 1.

Referring to the reference-letters in the drawings, A represents the framework of the truck, composed of the cross-piece A' and extensions $A^2$ and $A^3$, arranged at right angles thereto and firmly held in position by braces $a^4$ and $a^5$. The extensions $A^2$ and $A^3$ are provided with bearings $a^2$ and $a^3$, arranged to receive the axle $A^4$, upon which is mounted the wheel $A^5$.

Extending outward from the frame A and hinged at points $b$ and $b'$ to the extensions $A^2$ and $A^3$ are the arms or handles B and B', which are guided by yokes C and C', arranged at the extreme ends of the cross-piece A'.

The device forming the subject-matter of my invention is more particularly adapted to the carrying of carboys which are packed in wooden boxes forming a package of the relative shape and size shown by dotted lines in Figs. 1 and 2; but it will be understood that I do not limit myself to the particular construction shown nor to the particular character of the packages carried. These boxes are provided at the sides with projecting strips D and D', and the arms or handles B and B', being capable of lateral movement owing to their hinged connection with the framework, are extended, as shown in dotted lines in Fig. 1, and afterward brought under the projecting strips D and D', thus securing the box containing the carboy, which may be wheeled from place to place by a single operator, and thereby make it possible to dispense with the services of two carriers, which it has heretofore been the practice to employ in the transportation of goods and packages of this character.

Having described my invention, what I claim, and desire to secure by Letters Patent, is—

A truck comprising a transverse cross-piece, forwardly-projecting members extending from each end thereof, an axle journaled between and in the said forwardly-projecting members, yokes secured to the ends of the cross-piece in line therewith, a pair of handles, each handle being hinged at its forward end to the forward end of one of the said forwardly-projecting members at a point rear of the said axle and normally engaging the said member throughout its length rear of the hinge-point and passing through one of the said yokes, said yokes being arranged to engage the upper, lower and outer faces of the said handles and permitting a limited outward swinging thereof.

In testimony whereof I affix my signature in presence of two witnesses.

FREDERICK A. BIERIE.

Witnesses:
   WILSON STEARLY,
   WILLIAM S. YEO.